July 13, 1965  A. C. RUGE  3,194,050
DEAD WEIGHT CALIBRATING DEVICE WITH EXTENDED RANGE
Filed Jan. 27, 1961  4 Sheets-Sheet 1

Inventor
Arthur C. Ruge
by
ATTORNEY

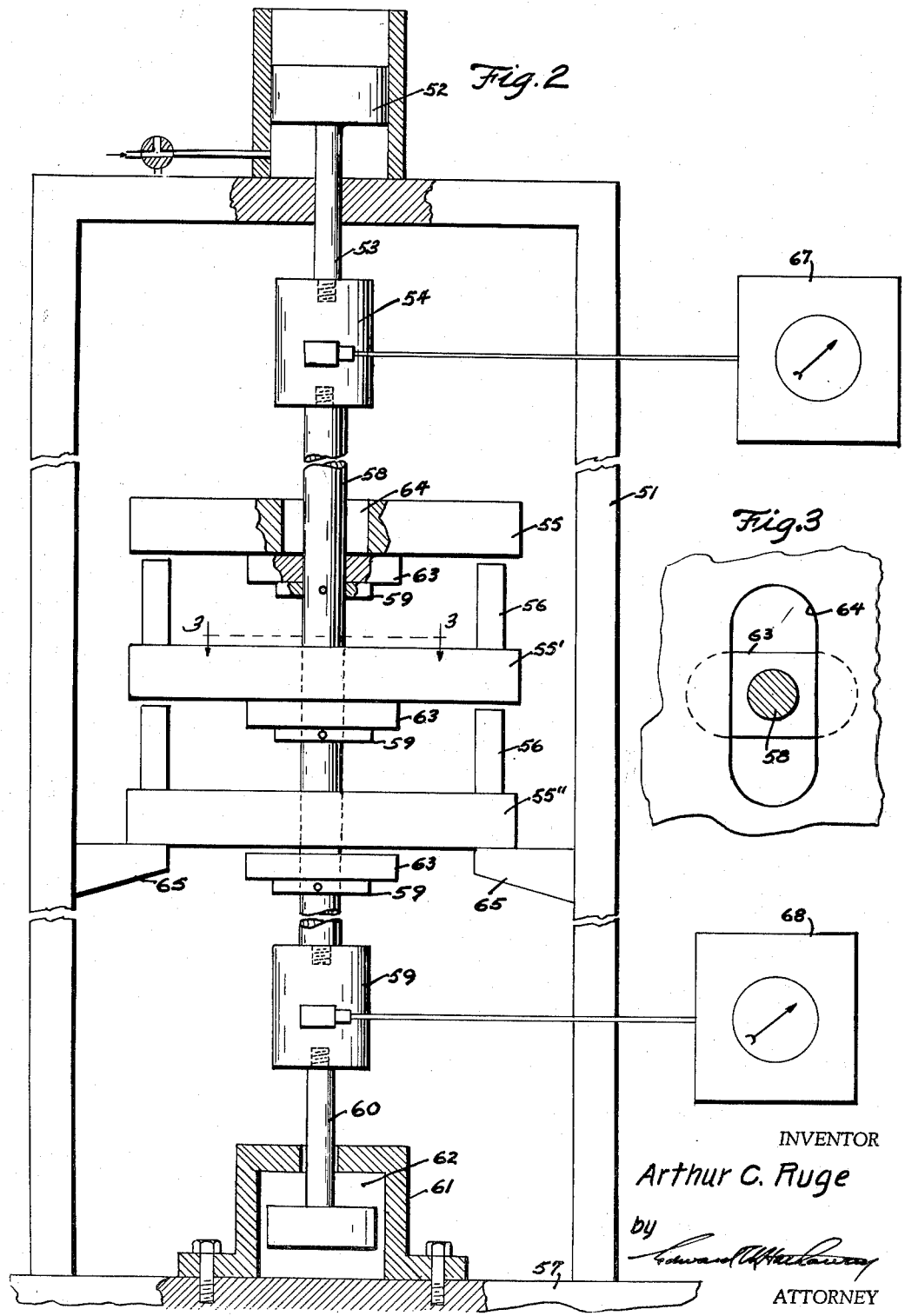

July 13, 1965 A. C. RUGE 3,194,050
DEAD WEIGHT CALIBRATING DEVICE WITH EXTENDED RANGE
Filed Jan. 27, 1961 4 Sheets-Sheet 4

INVENTOR
Arthur C. Ruge
BY
ATTORNEY

United States Patent Office 3,194,050
Patented July 13, 1965

3,194,050
DEAD WEIGHT CALIBRATING DEVICE WITH EXTENDED RANGE
Arthur C. Ruge, Lexington, Mass., assignor to Baldwin-Lima-Hamilton Corporation, a corporation of Pennsylvania
Filed Jan. 27, 1961, Ser. No. 85,392
14 Claims. (Cl. 73—1)

This invention relates to an apparatus and method for calibrating load cells.

A great variety of load or force-measuring devices is in common use today for such applications as the weighing of masses, the measurement of forces and reactions as in rocket testing, and in the calibration of still other forces measuring devices of lesser accuracy. Such devices are herein referred to broadly as "load cells" it being understood that the term includes mechanical devices such as providing rings, hydraulic load cells, electrically responsive load cells, etc. The electrically responsive cell is shown herein for purposes of illustration and may be considered to be similar to that shown in my Patent No. 2,561,318.

All load cells made today, when used in applications requiring more than the crudest accuracy, have this in common: They must be calibrated by some means having the ability to generate forces which are known to a higher degree of accuracy than that required of the load cell being calibrated. A number of arrangements have been employed for the purpose of calibrating load cells, but none of them can equal the accuracy obtainable from a so-called "dead weight" calibration device in which precisely known dead weights are supported directly by the load cell being calibrated in such a way that there is no friction or constraint of any kind which can affect the force generated by the action of gravity upon the dead weights. Since the field of gravity at any given location can be determined to extremely close limits, and since the local gravity field is of great constancy, being unaffected by temperature, barometric pressure, etc., there is no known physical principle which can equal or surpass pure dead weight calibration from the standpoint of accuracy obtainable.

As the capacity of a dead weight calibrating device becomes large, it becomes extremely bulky, cumbersome to operate, and very costly.

It is an object of my invention to provide a high-capacity dead weight calibration device having a range which is extended far beyond the loading capacity of the dead weights themselves while still controlling the accuracy of the entire calibration by the self-same dead weights.

Another object is to accomplish this result at a cost much less than what would be involved in a pure dead weight calibrating facility having such extended range.

A still further object is to provide a high-range calibrating device of relatively small bulk with corresponding ease and speed of operation.

In accomplishing these results I employ a quantity of known dead weights together with an auxiliary load cell which I call a "transfer" cell to apply a calibrating load to the load cell being calibrated (the "test cell") by simultaneously loading the latter directly with a predetermined amount of dead weight and with a predetermined amount of generated force transmitted directly to it by the auxiliary or transfer cell. And since the amount of force transmitted by the transfer cell is preferably determined directly by the same dead weights, I am able to extend the calibrating range of the device far beyond the load available from the dead weights while still retaining an extremely high degree of accuracy.

As will be seen from the disclosure herein the sole requirement of the transfer cell and its associated instrumentation is that it must be able to reproduce its response to a given load to the desired precision over a short period of time (usually a few minutes). And furthermore, since the transfer cell is employed to superimpose a load upon that generated by the dead weight available in the machine, the overall accuracy of the force generation is only partially affected by whatever inaccuracy there may be in the transfer cell and its instrumentation. For example, suppose a given machine has one hundred thousand pounds of precisely known dead weight and that the transfer cell is transferring another one hundred thousand pounds of force to the two hundred thousand pound load cell under calibration. Now, if the transfer cell fails to reproduce the predetermined load by one-twentieth percent, the two hundred thousand pound calibrating load would be in error by only one-fortieth percent since half of the load is made up by the precisely known dead weights. As a practical matter, the transfer cell, in all probability, would be a precision type of bonded electrical resistance filament strain gage load cell and years of experience with such cells shows that they can be made to reproduce response to load within one one-hundredth percent over periods of time much greater than required in the operation of the present invention. Therefore, it may be seen that the present invention offers the possibility of extending the range of a dead weight device far beyond that permitted by the dead weights themselves while still retaining a very high degree of accuracy. And since in very large capacity machines the cost of the weights and the bulky structure involved becomes a matter of serious concern, it may be seen that the present invention provides an economically attractive solution.

Other objects and advantages will be apparent to those skilled in the art from the following description of the accompanying drawings in which:

FIG. 2 is an elevational view of a modification of my calibration apparatus;

FIG. 3 is a fragmentary sectional view taken on line 3—3 of FIG. 2 showing means for adding or removing weights.

Figure 1:
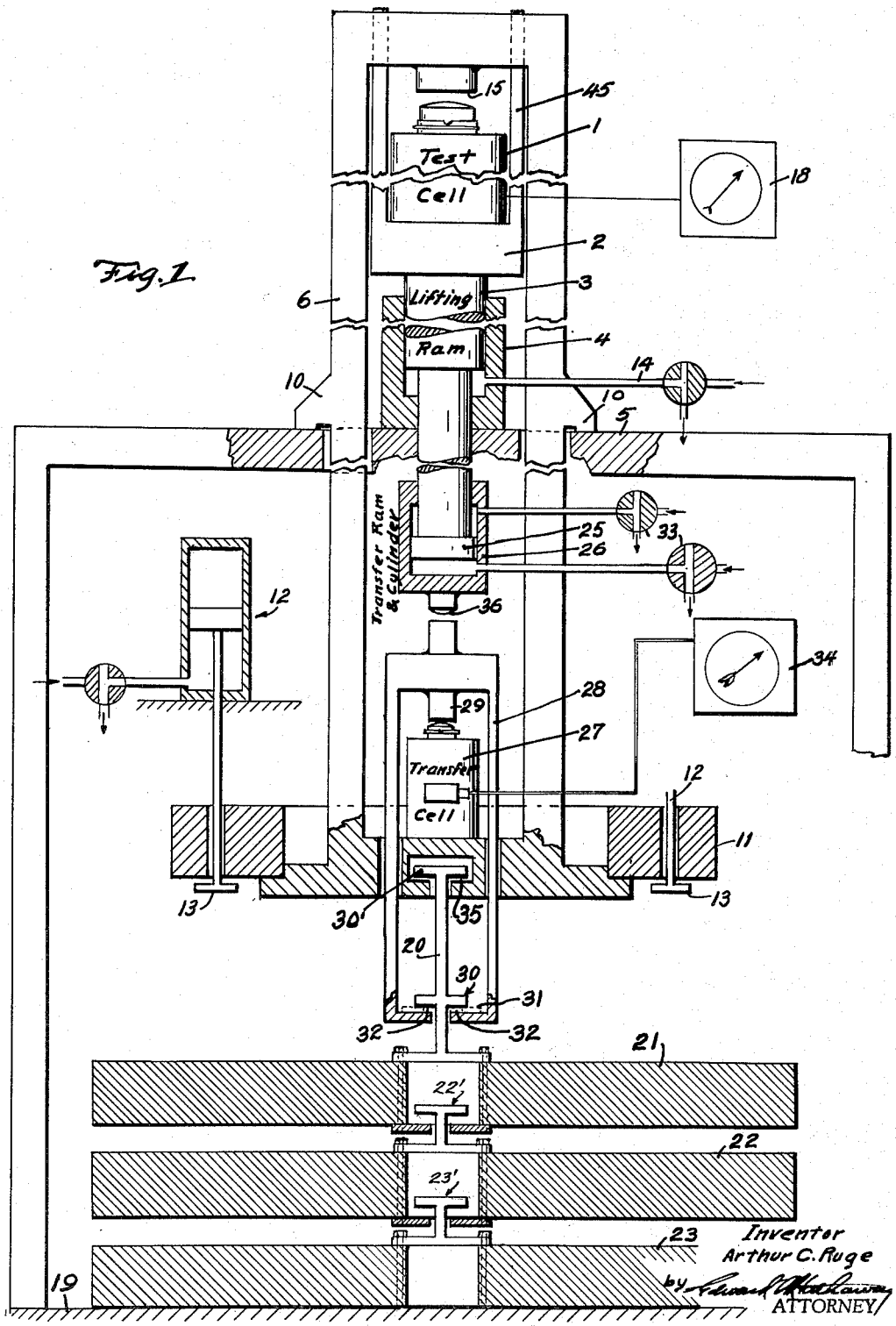
FIG. 1 is a diagrammatic elevation of my improved apparatus showing a compression type test cell in position to be calibrated, the tension testing portion at the top of the apparatus being only partially shown.

Referring to FIG. 1, a load cell 1 to be calibrated (the "test cell") is shown for purposes of illustration as a compression type cell. The test cell is supported on a platen 2 of a lifting ram 3 whose cylinder 4 is secured to a stationary support 5 connected through a suitable frame to a foundation 19 of the machine. A lifting yoke 6, which when not in use is supported by brackets 10 on support 5, encircles test cell 1 and lifting means 3 and 4, and carriers at its lower end laterally extended flanges upon which an auxiliary annularly-shaped dead weight 11 is removably supported.

This auxiliary weight may be removed from the yoke by pistons and cylinders 12 suitably disposed at two or more points around the auxiliary weight, the piston rods extending below the weight and being provided with any suitable means 13 for engaging the weight. The yoke 6 together with everything carried by it (except auxiliary weight 11) weighs exactly, say, 5,000 lbs. in the free state shown in FIG. 1. Hence, when fluid is admitted to lifting cylinder 4 through valve controlled passage 14 the test cell 1 is raised upwardly against a suitable head stop 15 formed on yoke 6 to raise it. The test cell is thus subjected to the 5000 lb. load carried by yoke 6. This load will be indicated on a suitable well-known indicator 18 which is of the electrical type if load cell 1 is of the electrical load responsive type. During this initial load the auxiliary weight 11 may be lifted by piston-cylinder 12 free of the yoke. To add another increment of test load, the weight 11 is lowered on to yoke 6. This auxiliary weight is preferably 5000 lbs. so that the test cell will now be calibrated to a 10,000 lbs. limit. To add additional 10,000 lb. increments the lifting ram 3 is raised still further until a 10,000 lb. weight 21 is lifted by any any suitable connection diagrammatically illustrated as a lost motion stem 20 conected to weight 21 and adapted to be suitably engaged by the lower end of yoke 6. Additional 10,000 lb. increments may be added simply by further raising ram 3 so that weights 22 and 23 are successively lifted by lost motion connections 22′ and 23′. It will be understood that while only three weights are shown, yet in an actual design twelve 10,000 lb. dead weights similar to 21, etc. have been provided. This will give a total dead weight calibration of 130,000 lbs. which can be broken down into 5,000 lb. increments merely by removing auxiliary weight 11 from the yoke between each successive lifting of one of the main dead weights 21, etc.

The broad principle of dead weight calibration to the extent disclosed above is not new.

To utilize, with a high degree of accuracy, the advantage of dead weight calibration beyond the capacity of the weights themselves, I have provided what I term a "transfer mechanism" including a transfer loading means and a transfer load cell. This loading means consists of a piston 25 connected to lifting ram 3 as a unitary part thereof and a transfer cylinder 26 adapted to float axially with or relative to the lifting piston 3. A transfer load cell 27 having a capacity of 120,000 lbs. (or equal to the total of the weights 21, etc.) is supported on the lower end of the lifting yoke 6 while an intermediate yoke 28 surrounds the transfer cell 27 and rests thereon through a downward yoke extension 29. The intermediate yoke may be connected to stem 20 of the first weight 21 through a lost motion connection 30 which is spaced from the lower end of yoke 28. This connection may be made rigid by any suitable means diagrammatically illustrated by inserting a removable block 31 (shown in dotted lines, FIG. 1) in the space 32 between the yoke 28 and lost motion member 30.

Operation

The preferred method of operation of this machine for calibrating test cell 1 at a load greater than the maximum load available from the dead weights is, first, calibrate the transfer cell 27 with the dead weights; second, calibrate the test cell with the dead weights; and, third, with the test cell still loaded with the dead weights then superimpose on the test cell a desired load transmitted through the calibrated transfer cell. To accomplish this sequence the lost motion connection 30 is made rigid by insertion of block 31. The lifting ram 3 is then moved upwardly to lift transfer cell 27 which is already in contact with extension 29 of yoke 28 so that continued lifting of ram 3 causes a predetermined amount of dead weight $W_1$, e.g., weights 21, 22 and 23, to be suspended from transfer cell 27 through yoke 28 and the reading of a well-known transfer cell indicator 34 noted which is of the electrical type if the transfer cell is of the electrical load responsive type. The lifting ram 3 is then lowered and the blocking 31 of connection 30 is removed. The lifting ram 3 is again raised to lift through yoke 6 and a head 30′ of stem 20 a predetermined amount of dead weight $W_2$ which is thereby applied to test cell 1. Space 35 beneath head 30′ is smaller than the space 32 for block 31, so that weights 21, etc. cannot now be supported on yoke 28, with the block removed. At this stage of operation it will be noted that transfer cell 27 is carrying only its tare weight comprised of yoke 28 and attachments and that lost motion connection 30 and a load transmitting button 36 of the transfer cylinder 26 are out of contact with yoke 28. As a result, no force is being transferred from transfer loading means 25 and 26, it being understood that by suitable three-way valves 33 cylinder 26 is held in its upper position by pressure fluid admitted to the top of cylinder 26 while the lower end thereof is exhausted. Next, the valves 33 are operated, introducing pressure to the lower end of cylinder 26 and exhausting the upper end so to exert a force through element 36 upon yoke 28, thereby loading transfer cell 27. By means of the lower one of valves 33 the oil pressure in transfer cylinder 26 is adjusted until indicator 34 reads exactly the same as it did with dead weight $W_1$ suspended from transfer cell 27. The situation at this stage is that a predetermined dead weight $W_2$ is hanging directly on test cell 1 through yoke 6 and lifting piston 3, and superimposed upon this load is a transfer force $W_1$, giving a total force exactly equal to $W_1$ plus $W_2$. The calibration of test cell 1 is then read on indicator 18, which completes the operation. The test cell can thus be calibrated starting with the weight of yoke 6 and adding increments of weight equal to auxiliary weight 11.

The sequence of operations described in the foregoing paragraph may be varied, or even reversed. For instance, assuming the calibration of the transfer cell is already closely known from previous experience, it may be desirable to perform the final calibration of the test cell ($W_1 + W_2$ loading) to determine if any correction is necessary to calibration of the test cell. In fact, if a very good transfer cell is selected it should not be necessary to check its calibration at $W_1$ loading more than once or twice in a day's work.

Alternative method of operation

The device also makes it possible to employ a method of operation which is analagous to the well-known method of "substitution weighing" used in dealing with masses. In this method the steps are as follows: Auxiliary weight 11 is first lifted off yoke 6 and test cell 1 is elevated by lifting ram 3 a sufficient amount that yoke 6 is suspended from the test cell (feet 10 now being free of frame 5) but spaces 32 and 35 are still free of the dead weights below. The weights of yokes 6 and 28 and of transfer cell 27 then become a tare weight acting on test cell 1 and indicator 18 is read or preferably set to zero. A predetermined additional amount of dead load $W_1$, i.e. weights 21 etc. is imposed upon test cell 1 by further raising yoke 6 by lifting means 3, 4 and the reading of indicator 18 is noted. The imposed additional dead weight is then released and test cell 1 is again elevated so that only its tare weight 6, 27 and 28 is suspended from it. While in this position, force-generating means 25, 26 is then operated to transmit force through transfer cell 27 and yoke 6 to test cell 1, so as to exactly reproduce the just-noted reading of indicator 18, and the reading of transfer cell indicator 34 is noted. Next, a predetermined dead weight $W_2$ is picked up on test cell 1 through yoke 6 and lifting means 3, 4 and the force from transfer cylinder 26 is adjusted until the previously-observed reading of instrument 34 is exactly reproduced. At this point test cell 1 is carrying a load of $W_1$ plus $W_2$. While this method is perhaps more correct technically inasmuch as it is analagous to substitution weighing, it is more awkward and introduces a second possible instrument error at instrument 18. However, it does provide an excellent cross-check against the calibrations made by the preferred operating method. The virtue of this alternative method lies in the fact that the transfer cell is loaded precisely in the same manner both times, which is not true of the preferred method.

Summary

Figure 4:
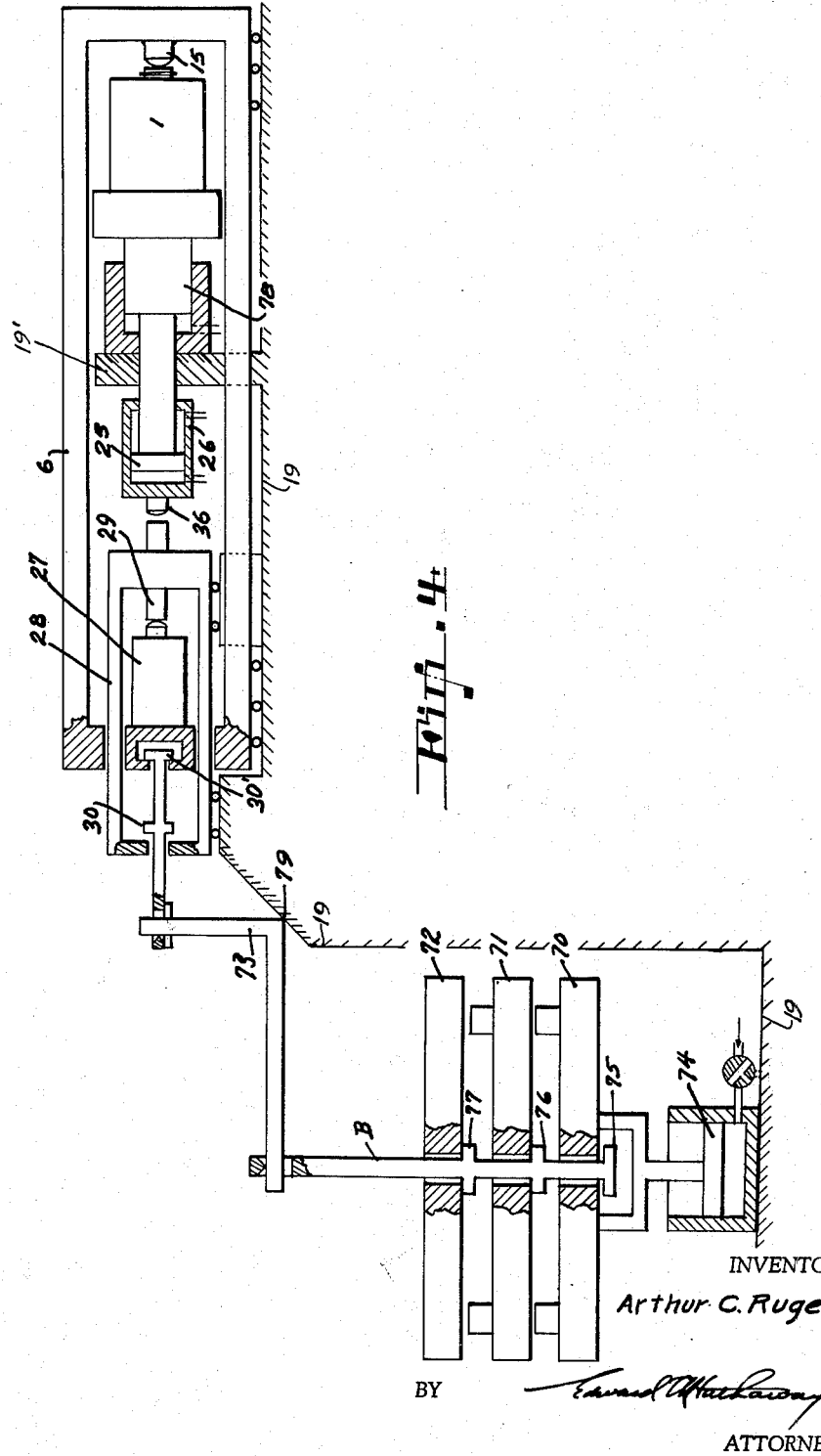
FIG. 4 is a diagrammatic illustration showing how the main portion of the calibrating apparatus may be disposed in a horizontal position.

Features of the present invention may be summarized as follows: The test cell and transfer cell are each aligned so as to be responsive to a force acting in a vertical direction and they are aligned vertically with each other, the word "vertical" being a relative term to describe the relation of parts inasmuch as the calibration machine can be positioned horizontally with the weights movable vertically by being connected to stem 20, e.g. with a bell crank as shown in FIG. 4 to be described later. Means are provided for supporting a predetermined amount of dead weight on the test cell. Additional means may, if desired, be provided for calibrating the transfer cell, either by hanging dead load directly on it, or by the analagous substitution method described under the alternative operating procedure so that the transfer cell is calibrated, either in the machine or elsewhere (such as the National Bureau of Standards), in terms of a predetermined amount of dead weight. Finally, means are provided for simultaneously loading the test cell with a predetermined amount of dead weight and with a predetermined amount of force transmitted directly to it by the transfer cell so that a calibration load is applied to the test cell in excess of the loading capacity provided by the dead weights of the machine. Preferably the excess load is determined by means of the machine's own dead weights and the transfer cell.

The range of this device is not limited to only twice the dead weight capacity of the machine. Suppose in the example given above that the test cell has a capacity of three hundred thousand pounds while only one hundred thousand pounds of dead weight is available. The first operation would be exactly as described in either of the above methods, at the end of which the test cell has been calibrated at two hundred thousand pounds. Now this two hundred thousand pound calibration is transferred by means of transfer cylinder 26 to transfer cell 27 as described in the alternate method of operation. Indicator 34 has now stored the necessary information for generating a two hundred thousand pound force. The next step is to suspend one hundred thousand pounds of dead weight upon test cell 1 through yoke 6 and lifting means 3 and then superimpose a transfer force of two hundred thousand pounds through transfer cell 27 and yoke 6, so that the calibration load on the test cell is now three hundred thousand pounds. If the load capacity of the transfer cell used in the initial step is not adequate for the higher load, a higher capacity transfer cell can be substituted for the second step or any subsequent step where needed. Naturally, there would be some degradation in accuracy as successive load transfers are built up. If the lack of dependability of force transfer is one-twentieth percent at each step then the maximum possible inaccuracy at a load equal to $n$ times the dead weight capacity will be, very closely, $$\frac{n-1}{2}$$

times one-twentieth percent. Thus, in the example just given extension of the range from one hundred thousand pound dead weight to three hundred thousand pound calibrating load could result in a maximum possible error of one-twentieth percent under the assumed transfer inaccuracy of one-twentieth percent. However, this accuracy can be greatly improved upon by employing load cells having a reproducibility of one one-hundreths percent, which is perfectly practical and by taking multiple observations at each transfer point so that the probable error for a range extension of three times dead weight can be easily brought down to one-fiftieth percent. This procedure would be followed for work of highest precision.

Figure 1A:
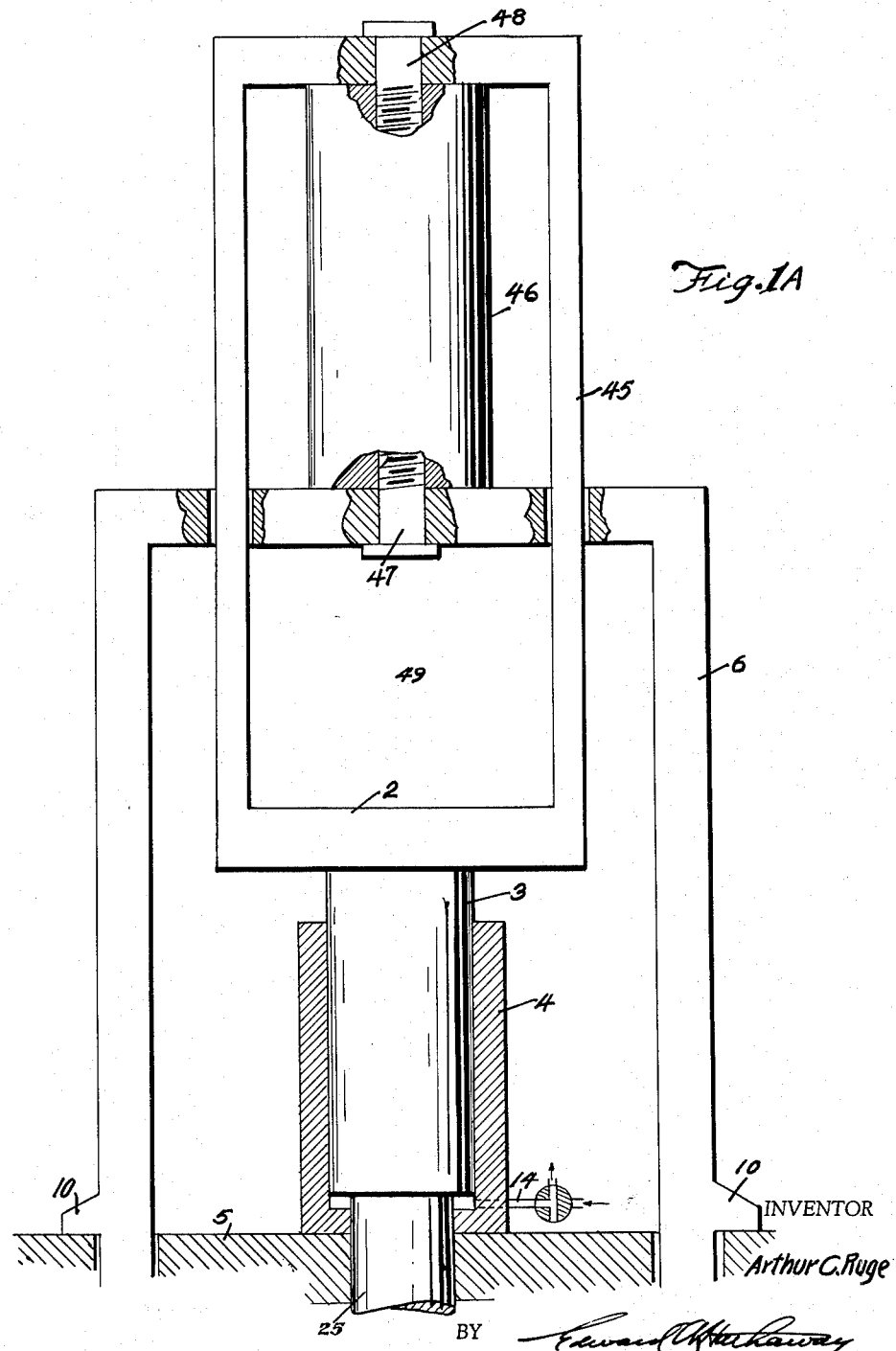
FIG. 1A is an enlarged view of the upper end of FIG. 1 to show the tension testing portion of the apparatus.

Tension calibration—FIG. 1A

This figure is a continuation of the upper end of FIG. 1 and permits tension cells to be calibrated. The lifting ram platen 2 has a yoke 45 extending above the main yoke 6. A tension cell 46 is secured by studs 47 and 48 to yokes 6 and 45. The operation of the machine for calibrating the cell is identical to that of the compression cell as is readily observed from the fact that a compression test cell would be located in space 49.

FIG. 2 modification

In this case, the transfer cylinder 26 of FIG. 1 is eliminated and the work is carried out in accordance with the alternate operating procedure described above. A frame 51 resting on foundation 57 supports a lifting ram 52 which actuates a lifting rod 53 to apply a desired calibrating load to a test cell 54, here shown as a tension cell although a compression cell with conventional yokes can be used equally well. A second rod 58 is attached to the lower end of test cell 54 and to the upper end of a transfer cell 59. A rod 60, flanged at its lower end, is attached to the lower end of transfer cell 59, and a stop means 61 attached to the foundation is provided so that a tension force may be applied to transfer cell 59 when a space 62 is blocked or eliminated by vertical travel of lifting ram 52. Again, transfer cell 59 is shown as a tension cell as a matter of convenience whereas a yoked compression cell can be used equally well.

A set of dead weights 55, 55' and 55" in the "free" position of the device rest upon supports 65. Rotatable weight engaging members 63 are supported on rod 58 by flanges 59 so that when in the position shown lifting means 52 can progressively lift dead weights 55, etc. in the desired order. The dead weights are provided with slots 64 shown in FIG. 4 so that by rotating any member 63 ninety degrees rod 58 can be moved vertically without touching the corresponding weight which is then carried by the next lower weight or by support 65 in the case of the bottom weight. Under this condition, ram 52 can apply a desired tension force to transfer cell 59 through elements 60 and 61 without engaging the dead weights.

Operation of FIG. 2

A predetermined amount of dead weight is first picked up through rod 58 and elements 63 by actuation of lifting ram 52, and the reading of the test cell indicator 67 is noted. The weights are then lowered so that weight 55" rests on support 65, weights 55" and 55' having extensions 56 to support weights 55' and 55 as they are lowered. All elements 63 are now rotated ninety degrees to their free position and ram 52 is moved upward until the tension force acting on transfer cell 59 is of such magnitude as to exactly reproduce the just-noted reading of indicator 67. The reading of indicator 68 is then noted. During this last process space 62 is either blocked or flanged rod 60 is elevated enough to take up the space. Ram 52 is then lowered and the weight engaging means 63 are put back in their original position for as many weights as will be needed for the calibration. Ram 52 is next lifted so as to pick up the desired number of weights and the lifting is continued until the tension force on transfer cell 59 exactly reproduces the just-observed reading of indicator 68. The calibrating load on test cell 54 is now equal to the sum of the weights last picked up plus a force equal to the weights which were utilized in transferring the predetermined force from the test cell to the transfer cell by means of indicators 67 and 68. In practical operation of such a calibrating machine it is sometimes desired to operate only at or above a given amount of dead weight. Thus, in the machine described above it may be desirable to run a series of calibrations in which the minimum dead load will be, say, fifty thousand pounds. In order to save the time consumed by progressively picking up the first five ten thousand pound weights for each calibration (only three weights being shown for illustration but as many may be provided as is necessary), I provide in FIG. 3 the rotatable weight engaging elements 63 as above described which make it possible to preselect one or more of the dead weights for each lifting increment. For example, in FIG. 2 if it is desired to have the first increment equal the sum of weights 55 and 55' one merely disengages the topmost bar 63 by rotating it whereupon weight 55 remains nested on weight 55' so that the lifting bar 63 under weight 55' will pick up both weights at once, the bar 63 for the lowermost weight 55" being disengaged. In this way, it is seen that I provide very simple means for increasing the versatility of the calibrating device at little cost. Lifting means 63 can of course be arranged to be operated remotely or it can be a simple manual rotation. It will be understood that elements 63 of FIG. 3 are schematically shown merely to illustrate the principle involved which is the provision of dead weight engaging means supported by the lifting means, the engaging means being so arranged that it can be made to engage or not engage a given dead weight at the will of the operator whereby the dead weights are then supported by the dead weights or support bracket 65. Thus, if in a given calibration it is desired to lift the weights progressively by twos, the weight engaging means are set to engage every other weight, etc. Many other ways of selectively engaging the weights will occur to anyone skilled in the art once the principle is understood. Perhaps the least expensive method is to thread rod 58 and substitute simple nuts for elements 63 using a round hole in the dead weights instead of slot 64 of FIG. 3. The nuts are then manually run up or down rod 58 so as to engage or not engage the desired weights. Alternatively, the nuts can be rotated by remotely controlled motors.

FIG. 4 modification

This shows the dead weights 70, 71, 72 applied to the calibrating machine through a bell crank 73, the portion to the right of the bell crank being shown as substantially identical to the upper portion of FIG. 1 except for the elimination of the auxiliary weight 11, supports 10 and frame 5. The yokes 6 and 28 are now supported by rollers or other equivalent anti-friction means. Similiar parts are therefore given similar reference numbers. The modification of FIG. 3 can be equally well adapted by anyone skilled in the art of machine design once the basic principles are understood. The use of the bell crank in FIG. 4 makes it possible to use a horizontal calibration setup which reduces headroom and may be more convenient for certain work. Also, the bell crank may be employed to gain mechanical advantage, thus reducing the amount of dead weight required for a given calibration capacity which becomes important for very large capacities such as a million pounds. The bell crank 73 is indicated as having a knife edge pivot 79. For highest accuracy work the knife edge would be replaced by a flexure pivot of suitable and well-known design. This and other details are subject to great variation by well-known principles without departing from the spirit of the present invention.

If the dead weights in FIG. 4 are arranged as shown in the lower portion of FIG. 1, the operation of the machine can be exactly as described for that modification, the bell crank merely changing the direction and/or magnitude of the dead weight forces. However, such operation is generally not desirable since the angular position of the bell crank would be different for each load picked up which complicates the design and introduces the necessity for using correction factors due to geometrical variation with load.

Since as a practical matter it is desirable (if not necessary) to keep the angular position of the bell crank always at some predetermined point while calibrating, there will normally be added a weight-lifting ram 74 which progressively lifts the weights 70, 71, 72 of their seats 75, 76, 77. Thus the addition or removal of dead weight does not require a change in angular position of crank 73.

The main ram 78 in this modification serves to so position the machine that the desired angular position of crank 73 is maintained at the time of calibration. This takes care of deformations, settlement, etc. which might result in rotation of the crank under load.

Alternatively, a load-lifting device could be inserted in the pickup rod at "B" in which case the arrangement of weights and accessories might be as shown in the lower portion of FIG. 1.

This description of the FIG. 4 modification will make clear the fact that many other modifications can be made by one skilled in the art once the basic principles set forth in connection with the modifications of FIGS. 1 and 3 are understood. Thus, simple levers and multiple lever systems may be employed to change the point and/or direction of application of dead weight forces applied to the calibration machine, as well as to gain any desired mechanical advantage of force. From the disclosure of the several modifications it is seen that elements 5 and 19 of FIG. 1, 57 of FIG. 2, and 19 and 19' of FIG. 4 constitute a base against which the means for lifting the dead weights reacts.

It will, of course, be understood that various changes in details of construction and arrangement of parts may be made by those skilled in the art without departing from the spirit of the invention as set forth in the appended claims.

I claim:
1. A dead weight calibrating device for calibrating the response of a load cell which is to be tested comprising, in combination, means for supporting and orienting a load cell to be tested for response to force acting in a given direction, for indicating the responses of a load cell to be tested to force applied thereto in said direction, a quantity of dead weight, a base, means reacting against said base for lifting a predetermined amount of said weight directly through a load cell to be tested while it is supported and oriented by said mounting means, and means including said lifting means and an auxiliary load cell and means for indicating responses of the auxiliary load cell for applying a predetermined additional force in series with the auxiliary load cell and a cell to be tested, supported and oriented by said mounting means, the load carried by the auxiliary load cell being free of the dead weight carried by the load cell to be tested, whereby the total force acting on the cell to be tested as indicated by the indicating means therefor extends the calibration range of the load cell to be tested beyond the force capacity provided by the total dead weight employed.

2. The combination set forth in claim 1 further characterized in that the quantity of dead weight comprises a plurality of individual weights, and means are provided whereby any desired number of such individual weights may be engaged during the lifting action of the lifting means.

3. The combination set forth in claim 1 further characterized in that the means for applying the predetermined additional force transmits the additional force to the load cell to be tested through the auxiliary, and means are provided for determining when the desired magnitude of such additional force has been obtained including said means for indicating responses of the auxiliary load cell, whereby the total force on the first load cell is determined by the dead weight carried thereby and by the indicated force of the second load cell.

4. The combination set forth in claim 1 further characterized in that the means for applying a predetermined additional force to the load cell to be tested includes means for supporting said auxiliary load cell so that the force thereof passes through the lifting means to the cell to be tested.

5. The combination set forth in claim 1 further characterized in that the means for applying a predetermined additional force to the load cell to be tested includes means for supporting the auxiliary load cell so that the forces of the load cell to be tested and auxiliary load cells are in series with each other.

6. The combination set forth in claim 1 further characterized by the provision of means whereby the dead weight force and the additional predetermined force may be applied as tension forces to the load cell to be tested.

7. The combination set forth in claim 1 further characterized by the provision of means whereby the load cell to be tested may be calibrated in tension or compression.

8. A dead weight calibrating device for calibrating the response of a load cell which is to be tested comprising, in combination, means for supporting and orienting a load cell to be tested for response to force acting in a given direction, means for indicating the responses of a load cell to be tested force applied thereto in said direction, said means for supporting and orienting including a cylinder and a ram for supporting one end of a load cell to be tested and for moving the same in said direction, a first yoke encircling said ram and cylinder and having one end extending to a position for engagement with the other end of a load cell to be tested, a plurality of weights, a base means reacting against said base for lifting any given number of said weights by said yoke when the ram is moved in said direction thereby imposing a known dead weight force on a load cell to be tested, as indicated by its indicating means, an auxiliary load cell supported at one end against the other end of said yoke, second indicating means responsive to force applied to said auxiliary load cell, a second yoke encircling said auxiliary load cell for engagement with the other end thereof, means for lifting any desired number of said weights by said second yoke so as to produce on the indicating means of the auxiliary load cell an indication of a known force, and a second ram and cylinder for applying a force to said second yoke to impose a load on the auxiliary load cell of a magnitude equal to the previous amount of weight supported thereon as indicated by its indicating means, whereby the desired number of weights may be connected to a load yoke to establish a predetermined dead weight load on the first cell to be tested and the second ram and cylinder may impose an additional known load on a load cell to be tested by transmitting such additional load through the auxiliary load cell until the indicating means thereof indicates that the additional force is equal to that previously established by the dead weights.

9. The combination set forth in claim 8 further characterized in that the second ram is connected to the first ram for movement therewith and the second cylinder is free to float with movement of the first ram.

10. The combination set forth in claim 8 further characterized in that the first yoke is movable in a vertical direction, and an auxiliary weight of less magnitude than said other weights is removably supported on said first yoke whereby the force of the auxiliary weight may be imposed on or removed from a load cell to be tested in between the successive additions of said plurality of weights thereby reducing the increments of calibrated loading to that of the auxiliary weight throughout the full range of the device.

11. A device for calibrating the response of a load cell which is to be tested, comprising, in combination, means for supporting and orienting a cell to be tested for response to force applied to it, a quantity of dead weights, a ram and cylinder, means actuated by said ram and cylinder for lifting a predetermined amount of said weights and applying the same to a cell to be tested, means for indicating the response of a cell to be tested to applied force, means for releasing the weights from and reconnecting the weights to a cell to be tested, an auxiliary load cell, means including said releasing means and said ram and cylinder for applying to the auxiliary cell in series with a cell to be tested, an auxiliary force equal to the indicated response of a cell to be tested independently of the weights, and means for indicating the response of the auxiliary cell to its applied force, means including said reconnecting means and said ram and cylinder for lifting the dead weights and imposing upon a cell to be tested the combined force of the predetermined amount of dead weights and a force equal to that indicated by the auxiliary cell indicating means while said auxiliary force was applied thereto.

12. The combination set forth in claim 11 further comprising means for commonly connecting a cell to be tested and the auxiliary cell, and means connecting the ram and cylinder to one of the cells whereby the force generated by the ram and cylinder is transmitted to both of the cells in series.

13. The combination set forth in claim 11 further characterized by the provision of means for commonly connecting a cell to be tested and the auxiliary cell, the ram and cylinder being connected to one of the cells so that both are movable simultaneously by the ram and cylinder, and means connected to the other of said cells to limit the movement thereof, whereby upon connection of a desired number of weights to the common connecting means the ram can lift the same and impose a dead weight load on a cell to be tested and upon continued movement the limit means will allow the ram and cylinder to impose a force upon the auxiliary cell.

14. The method of calibrating the response to a load cell to a force applied to it, consisting of providing two load cells, calibrating the response to one of said cells in terms of a known force, applying a known dead weight force to the second cell, and imposing on said second cell while its dead weight force is applied thereto an additional force measured by and equal to the calibrated response of the first cell, said additional force being applied to said first cell solely by means of a force-generating means so that said first cell is free of said known dead weight force and said additional force, thereby causing the calibration range of the second cell to be extended beyond the force capacity provided by the total dead weight.

References Cited by the Examiner
UNITED STATES PATENTS 2,577,944  12/51  Arthuis _____ 73—93
2,925,728  2/60   MacDonald _____ 73—1

OTHER REFERENCES

NBS Technical News Bulletin, September 1953, vol. 37, No. 9, pages 136 and 137.

ISAAC LISANN, *Primary Examiner.*